(12) United States Patent
Yamakawa et al.

(10) Patent No.: US 9,407,172 B2
(45) Date of Patent: Aug. 2, 2016

(54) VIBRATION POWER GENERATOR

(71) Applicants: Panasonic Corporation, Osaka (JP); Stichting IMEC Nederland, AE Eindhoven (NL)

(72) Inventors: Takehiko Yamakawa, Osaka (JP); Yasuyuki Naito, Osaka (JP); Keiji Onishi, Osaka (JP); Kunihiko Nakamura, Osaka (JP); Hiroshi Nakatsuka, Osaka (JP); Michael Renaud, Lommel (BE); Robertus T. F. van Schaijk, BH Eindhoven (NL)

(73) Assignees: Panasonic Corporation, Osaka (JP); Stichting IMEC Nederland, Eindhoven (NL)

( * ) Notice: Subject to any disclaimer, the term of this patent is extended or adjusted under 35 U.S.C. 154(b) by 235 days.

(21) Appl. No.: 14/060,073

(22) Filed: Oct. 22, 2013

(65) Prior Publication Data

US 2014/0111061 A1    Apr. 24, 2014

(30) Foreign Application Priority Data

Oct. 24, 2012 (JP) ................................. 2012-234808

(51) Int. Cl.
*H02N 1/08* (2006.01)
(52) U.S. Cl.
CPC ...................... *H02N 1/08* (2013.01)
(58) Field of Classification Search
CPC ............ H01L 41/0533; H01L 41/0475; H01L 41/125; H02N 2/186; H02N 1/08; H02N 11/00; H02N 11/002; H02N 11/008; H01G 7/00
USPC ........ 310/36, 38, 300, 309; 307/400; 200/181
See application file for complete search history.

(56) References Cited

U.S. PATENT DOCUMENTS 8,089,194 B2 * 1/2012 Naruse ................... H02N 1/006
310/300
2009/0174281 A1 * 7/2009 Lo et al. ........................ 310/300
(Continued)

FOREIGN PATENT DOCUMENTS

| JP | 2007-312551 | * 11/2007 |
|---|---|---|
| JP | 2009-240058 | 10/2009 |
| JP | 2010-81724 | 4/2010 |
| JP | 2010-273510 | 12/2010 |
| JP | 2011-221002 | 11/2011 |

OTHER PUBLICATIONS

Machine translation for JP 2007-312551.*

(Continued)

*Primary Examiner* — Burton Mullins
(74) *Attorney, Agent, or Firm* — Wenderoth, Lind & Ponack, L.L.P.

(57) ABSTRACT

A vibration power generator comprises: a fixed substrate; a vibrating body having a surface opposed to the fixed substrate, the vibrating body being vibratable to the fixed substrate; electret electrodes aligned in a vibration direction on one of the surface of the fixed substrate and the surface of the vibrating body; and first fixed electrodes and second fixed electrodes alternately aligned in the vibration direction on the other thereof, wherein when the vibrating body is at a resting position, each of the electret electrodes overlaps with both electrodes of a corresponding fixed electrode pair, the corresponding fixed electrode pair being one of the first fixed electrodes and one of the second fixed electrodes that are opposed to the electret electrode, and when the vibrating body is not at a resting position, each of the electret electrodes always overlaps with at least one electrode of the corresponding fixed electrode pair.

4 Claims, 14 Drawing Sheets

(56) References Cited

U.S. PATENT DOCUMENTS

| | | |
|---|---|---|
| 2009/0243429 A1 | 10/2009 | Naruse et al. |
| 2010/0072855 A1 | 3/2010 | Matsubara et al. |
| 2011/0316384 A1* | 12/2011 | Nakatsuka et al. ........... 310/300 |
| 2012/0318056 A1 | 12/2012 | Izumi et al. |

OTHER PUBLICATIONS

Tatsuakira Masaki et al., "Power output enhancement of a vibration-driven electret generator for wireless sensor applications", Journal of Micromechanics and Microengineering, vol. 21, Issue 10, Oct. 2011.

* cited by examiner

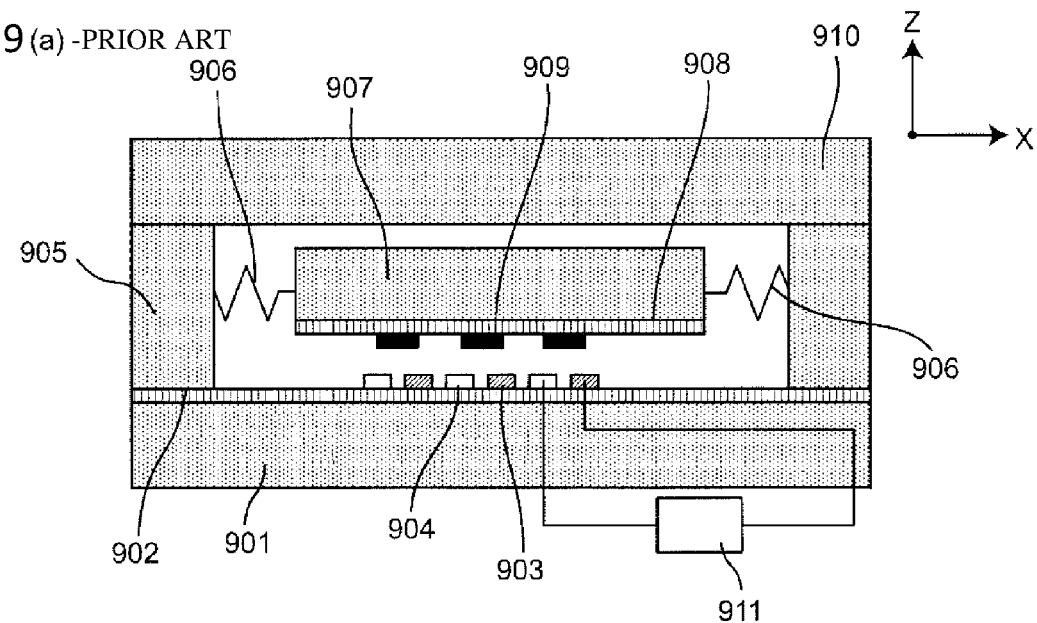
Fig. 9(a) -PRIOR ART
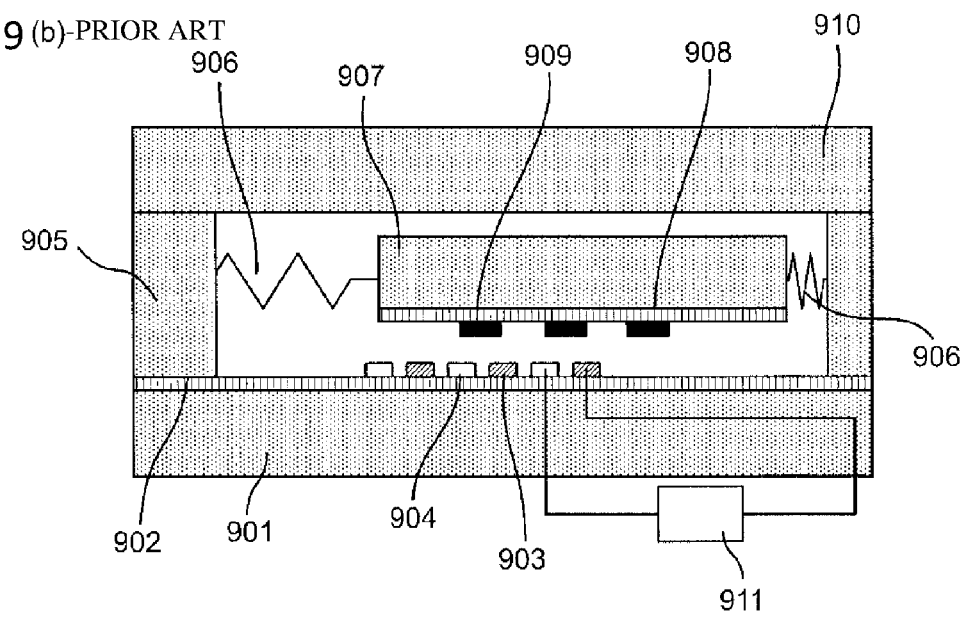
Fig. 9(b)-PRIOR ART

Fig. 10 -PRIOR ART
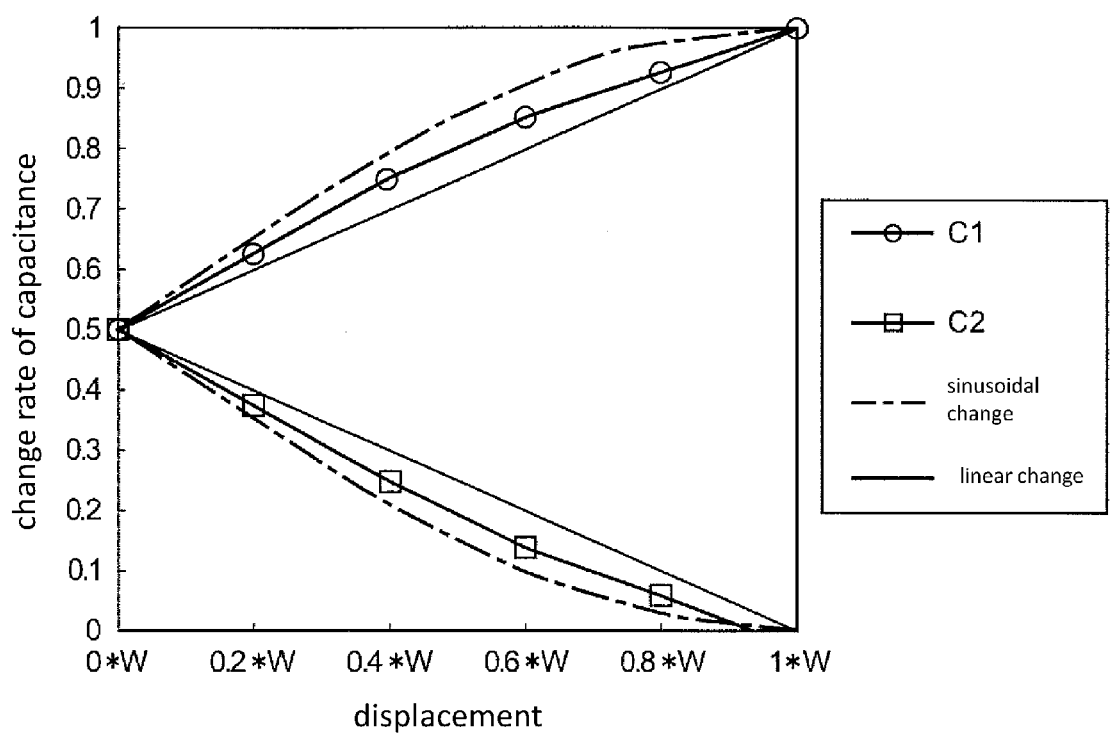

Fig. 11 -PRIOR ART
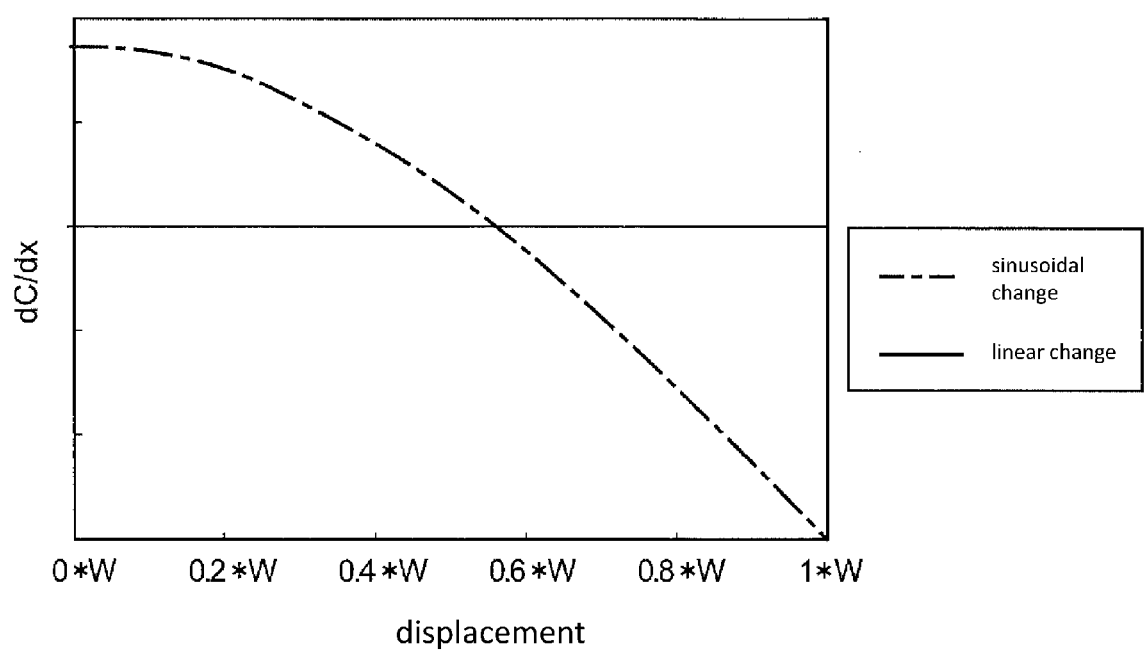

Fig. 12-PRIOR ART
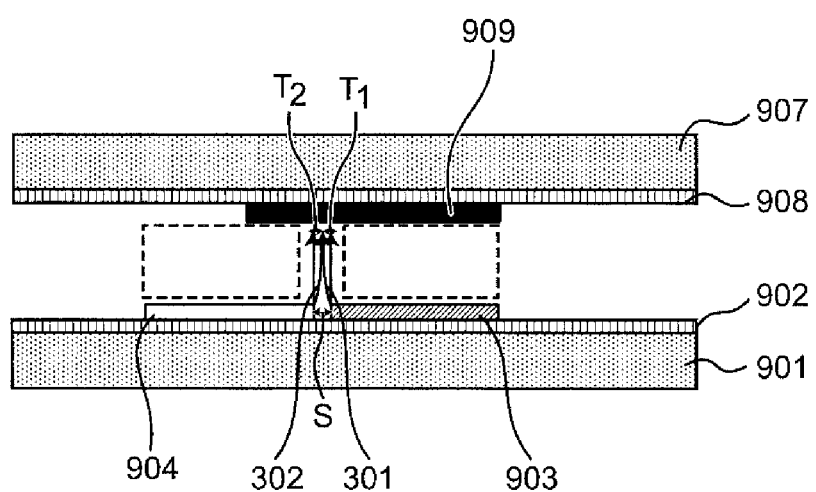

VIBRATION POWER GENERATOR

BACKGROUND OF THE INVENTION

1. Field of the Invention

The present invention relates to a vibration power generator that converts vibration energy into electric power.

2. Description of Related Art

In recent years, attention has been paid to energy harvesting, which is to extract electric power from energy widely present in the environment for feeding it to low-power electronic devices, including solar power generation, thermoelectric generation, electromagnetic induction using magnets and coils, and the like. One of such techniques known in the art is an electrostatic induction vibration power generator, which extracts electric power from vibration energy of human bodies, vehicles, machines and the like. Electrostatic induction vibration power generators include a semi-permanently charged film called electret that is placed either on an electrode of a vibrating body or on a fixed electrode opposed to the vibrating body in a device. By changing the electrostatic capacity between the two electrodes, an electric current is induced, and the induced current generates a voltage. An electric power is thus extracted.

FIGS. 9(a) and 9(b) show a conventional vibration power generator. FIG. 9(a) is a cross-sectional view of the vibration power generator when its vibrating body is at a resting position. FIG. 9(b) is a cross-sectional view of the vibration power generator when its vibrating body is displaced. As illustrated in FIGS. 9(a) and 9(b), an insulation film 902 is provided on a fixed substrate 901. On the insulation film 902, a plurality of first fixed electrodes 903 having a width 2w and a plurality of second fixed electrodes 904 having a width 2w are alternately placed at gaps w/10. On the fixed substrate 901, a hollow spacer 905 is placed. The spacer 905 and the vibrating body 907 are connected to each other via at least two springs 906 in such a manner that the vibrating body 907 is vibratable with respect to the spacer 905. The vibrating body 907 is placed facing the fixed substrate 901, and spaced from the fixed substrate 901 such that electret electrodes 909 formed on the vibrating body 907 are positioned at a distance w from the first fixed electrodes 903 or the second electrodes 904 formed on the fixed substrate 901. On the vibrating body 907, the electret electrodes 909 having a width 2w+w/10 are placed, and the vibrating body 907 and the electret electrodes 909 are sandwiching an insulation film 908. The vibrating body 907, the first fixed electrodes 903 and the second fixed electrodes 904 are arranged such that, when the vibrating body 907 is at a resting position, each overlap between the electret electrodes 909 and the first fixed electrodes 903 or the second fixed electrodes 904 has a width w in the x direction if viewed from a top-down perspective. Further, a lid substrate 910 is provided on the spacer 905 to seal the vibration power generator. The electret electrodes 909 are injected with negative charge, and the vibrating body 907 is vibratabie in the x direction. As illustrated in FIGS. 9(a) and 9(b), the highest positive charge is induced at the first fixed electrodes 903 when change of a first capacitance C1 between the electret electrodes 909 and the first fixed electrodes 903 reaches the maximum value, and the highest positive charge is induced at the second fixed electrodes 904 when change of a second capacitance C2 between the electret electrodes 909 and the second fixed electrodes 904 reaches the maximum value. Such increases and decreases of the electric charge induce a current, and the vibration power generator thus generates electric power (see Tatsuakira Masaki "Power output enhancement of a vibration-driven electret generator for wireless sensor applications", Journal of Micromechanics and Microengineering, Vol. 21, Issue 10 (October 2011)).

However, because the gaps between the first fixed electrodes 903 and the second fixed electrodes 904 are as narrow as w/10 (a twentieth part of the width of the first fixed electrodes 903 or the second fixed electrodes 904 in the x direction), change of the capacitance C1 between the electret electrodes 909 and the first fixed electrodes 903 as wells as change of the capacitance C2 between the electret electrodes 909 and the second fixed electrodes 904 come close to sinusoidal change. This causes strong electrostatic force between the electret electrodes 909 and the first fixed electrodes 903 or the second fixed electrodes 904 when the vibrating body 907 is around the position of displacement=0, which inhibits displacement of the vibrating body 907 and eventually decreases the power generation. This has been a problem of the above-described conventional generator.

Furthermore, the electrostatic force is weak when the vibrating body 907 is around the position of maximum displacement, which creates another problem that the vibrating body 907 may collide against a stopper and be broken.

SUMMARY OF THE INVENTION

It is an object of the present invention to provide a vibration power generator that can generate increased electric power. Another object of the present invention is to provide a vibration power generator that offers high reliability by preventing its vibrating body from breakage.

The vibration power generator according to an embodiment of the present invention includes:

a fixed substrate;

a vibrating body having a surface opposed to a surface of the fixed substrate, the vibrating body being vibratable with respect to the fixed substrate;

a plurality of electret electrodes aligned in a vibration direction of the vibrating body on one of the surface of the fixed substrate and the surface of the vibrating body; and a plurality of first fixed electrodes and a plurality of second fixed electrodes, each of the plurality of first fixed electrodes and each of the plurality of second fixed electrodes being alternately aligned in the vibration direction on the other of the surface of the fixed substrate and the surface of the vibrating body, wherein when the vibrating body is at a resting position with respect to the fixed substrate, each of the plurality of electret electrodes overlaps with both electrodes of a corresponding fixed electrode pair if viewed from a top down perspective, the corresponding fixed electrode pair being one of the plurality of first fixed electrodes and one of the plurality of second fixed electrodes that are opposed to the one of the plurality of electret electrode, and when the vibrating body is not at a resting position, each of the plurality of electret electrodes always overlaps with at least one electrode of the corresponding fixed electrode pair if viewed from a top down perspective.

According to the present invention, it becomes possible to provide a vibrating power generator that can generate increased electric power. It also becomes possible to provide a vibration power generator having high reliability by preventing its vibrating body from breakage.

BRIEF DESCRIPTION OF DRAWINGS

FIG. 9(a) is a cross-sectional view of a conventional vibration power generator when its vibrating body is at a resting position. FIG. 9(b) is a cross-sectional view of the conventional vibration power generator when its vibrating body is displaced.

FIG. 10 is a graph on the conventional vibration power generator, showing change of a first capacitance between electret electrodes and first fixed electrodes and change of a second capacitance between the electret electrodes and the second fixed electrodes, in accordance with displacement of the vibrating body.

FIG. 11 is a graph on the conventional vibration power generator, showing differentials (dC/dx) of the linear capacitance change and the sinusoidal capacitance change of FIG. 10 with respect to the displacement in the x direction.

FIG. 12 is a view for briefing a fringing field of the conventional vibration power generator.

DESCRIPTION OF EMBODIMENTS

Figure 1A:
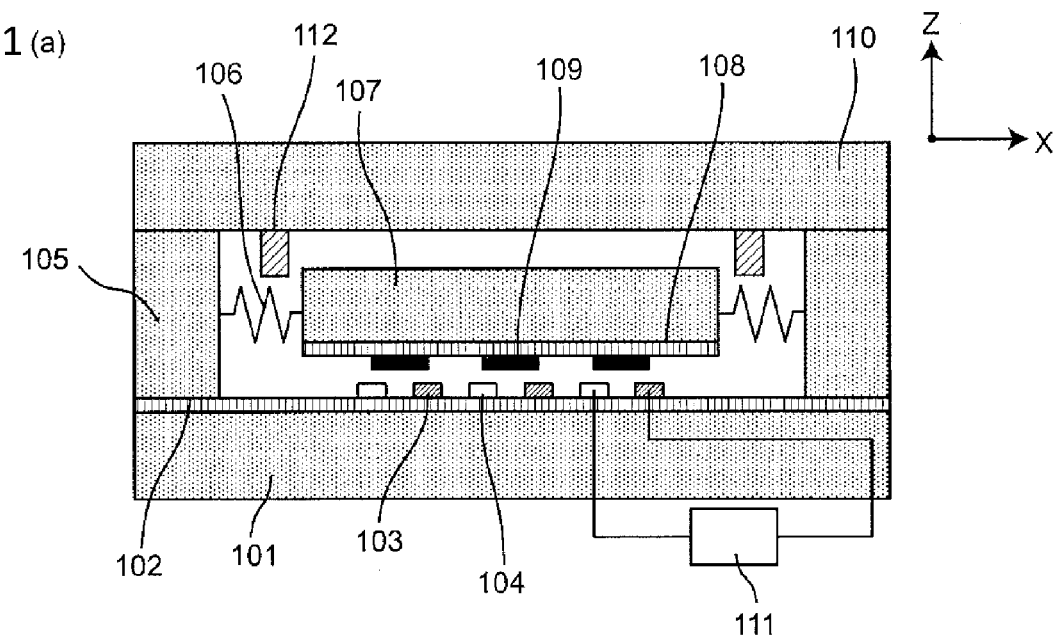
FIG. 1(a) is a cross-sectional view of a vibration power generator according to an embodiment of the present invention when a vibrating body is at a resting position.

As a result of inventors' keen study on the above problems, they obtained the following knowledge about a vibrating power generator including: a fixed substrate; a vibrating body vibratably placed with respect to the fixed substrate; electret electrodes aligned on the vibrating body; and first and second fixed electrodes alternately aligned on the fixed substrate. If the distance between the first fixed electrodes and the second fixed electrodes is shorter than the sum of the expansion widths of a first fringing field and a second fringing field, these expansion widths of the first fringing field and the second fringing field are both decreased by the repulsive force between them. Here, the first fringing field is an electric field created by an electric flux that flows from the first fixed electrodes to the electret electrodes as expanding toward the second fixed electrodes, and the second fringing field is an electric field created by an electric flux that flows from the second fixed electrodes to the electret electrodes as expanding toward the first fixed electrodes. This suppresses change of the capacitance at the position immediately before the electret electrodes reaches maximum displacement, and the shape of the capacitance curve accordingly comes close to a sine curve. The electrostatic force acting on the electret electrodes is proportional to a differential of the capacitance with respect to the displacement. When the capacitance curve is analogous to a sine curve, the differential of this approximate sine curve is analogous to a tangent curve. As illustrated in FIG. 11, when the electret electrodes are not displaced, i.e. at an initial position, the differential value is larger than that of a straight line. This means that an electrostatic force is acting on the electret electrodes 909, which prevents the vibrating body 907 from displacement. In contrast, when the vibrating body 907 is around the position of maximum displacement, the differential value is smaller than that of a straight line (i.e. smaller than 0). This means that an electrostatic force is not acting on the vibrating body 907 very much, which may lead to breakage of the vibrating body 907 by collision of the vibrating body 907 with a stopper. On the basis on the above findings, the inventors made further study on the problems, and found that the change of the capacitance comes close to linear change by spacing the first fixed electrodes from the second fixed electrodes to the extent that no repulsive force acts between their fringing fields. As a result, around the position of displacement=0, the electrostatic force is low enough not to prevent a movement of the vibrating body, which results in an improvement of the power generation. Around the position of maximum displacement, strong electrostatic force can prevent the vibrating body from colliding against a stopper. Furthermore, they also found that the change of the capacitance comes close to linear change by regulating the amplitude of the electret electrodes such that when the vibrating body is at a resting position, each electret electrode overlaps with both electrodes of a corresponding fixed electrode pair if viewed from a top down perspective, the corresponding fixed electrode pair being composed of a first fixed electrode and a second electrode that are opposed to the electret electrode, and when the vibrating body is not at a resting position, each electret electrode always overlaps with at least one electrode of the corresponding fixed electrode pair. As a result, around the position of displacement=0, the electrostatic force is low enough not to prevent the movement of the vibrating body, which results in improvement of the power generation. Around the position of maximum displacement, strong electrostatic force can prevent the vibrating body from colliding against the stopper. The present invention has been made based on these findings.

FIG. 10 is a graph on the conventional vibration power generator of FIGS. 9(a) and 9(b), showing change of a first capacitance between electret electrodes and first fixed electrodes and change of a second capacitance between the electret electrodes and the second fixed electrodes, in accordance with displacement of the vibrating body. FIG. 10 can be drawn by the boundary element method. Different from the finite element method, when the boundary element method is carried out, the inside of an object is not divided into a grid of elements, but only the electrode surface is divided into a grid of elements. The boundary element method is one of widely-used major general discretization methods, including the difference method and the finite element method. Regarding the capacitance between opposing parallel plates, there is no significant difference in its change profile among these methods.

FIG. 10 shows change of the first capacitance between the electret electrodes 909 and the first fixed electrodes 903 and change of the second capacitance between the electret electrodes 909 and the second fixed electrodes 904, when the vibrating body 907 displaces from 0 to w. Within the range where the vibrating body displaces from 0 to w, the change of the first capacitance C1 between the electret electrodes 909 and the first fixed electrodes 903 and the change of the second capacitance C2 between the electret electrodes 909 and the second fixed electrodes 904 are normalized such that the values become 0.5 (midpoint) at the position of displacement=0 and the value becomes 1.0 (maximum value) at the position of displacement=w or −w. The graph does not include the range from −w to 0 of the displacement since the first capacitance change C1 and the second capacitance change C2 in this range are symmetrical to those in the range from 0 to w of the displacement. Also, the graph does not include the ranges over ±w of the displacement since the graph in these ranges can be analogized from the graph in the range from 0 to w of the displacement. For comparison, an example of linearly changing capacitance, i.e. linear capacitance change, and an example of sinusoidal capacitance change are plotted together.

Each of the electrostatic force in the x direction derived from the potential difference between the electret electrodes 909 and the first fixed electrodes 903 and the electrostatic force in the x direction derived from the potential difference between the electret electrodes 909 and the second fixed electrodes 904 is proportional to the differential dC/dx of the capacitance change with respect to displacement. That is, the slope of the capacitance change is greatly related to the electrostatic force that inhibits the vibration.

FIG. 11 shows differentials (dC/dx) of the linear capacitance change and the sinusoidal capacitance change of FIG. 10 with respect to displacement in the x direction. Within the range from 0 to 0.56 w of the displacement in the x direction, the linear change exhibits larger dC/dx than the sinusoidal change, which shows a presence of strong electrostatic force. Within the range of 0.56 w or more of the displacement in the x direction, the linear change exhibits smaller dC/dx than the sinusoidal change, which shows a presence of weak electrostatic force.

Accordingly, if the capacitance changes linearly, the electrostatic force is weaker than that in the case of sinusoidal change when the vibrating body starts to move (w=0). As a result, the vibrating body can move more easily, which eventually increases the power generation. Also, the electrostatic force is stronger than that in the case of sinusoidal change when the vibrating body stops (w=w). As a result, the vibrating body collides less against a spacer because of the breaking force.

On the basis of the above findings, the present inventors developed the following aspects of the present invention.

(First Aspect)

A first aspect of the present invention is a vibration power generator, comprising:

a fixed substrate;

a vibrating body having a surface opposed to a surface of the fixed substrate, the vibrating body being vibratable with respect to the fixed substrate;

a plurality of electret electrodes aligned in a vibration direction of the vibrating body on one of the surface of the fixed substrate and the surface of the vibrating body; and a plurality of first fixed electrodes and a plurality of second fixed electrodes, each of the plurality of first fixed electrodes and each of the plurality of second fixed electrodes being alternately aligned in the vibration direction on the other of the surface of the fixed substrate and the surface of the vibrating body, wherein when the vibrating body is at a resting position with respect to the fixed substrate, each of the plurality of electret electrodes overlaps with both electrodes of a corresponding fixed electrode pair if viewed from a top down perspective, the corresponding fixed electrode pair being one of the plurality of first fixed electrodes and one of the plurality of second fixed electrodes that are opposed to the one of the plurality of electret electrodes, and when the vibrating body is not at a resting position, each of the plurality of electret electrodes always overlaps with at least one electrode of the corresponding fixed electrode pair if viewed from a top down perspective.

(Second Aspect)

A second aspect of the present invention is the vibration power generator according to the first aspect, wherein the plurality of electret electrodes are placed on the vibrating body, and the plurality of first fixed electrodes and the plurality of second fixed electrodes are placed on the fixed substrate.

(Third Aspect)

A third aspect of the present invention is the vibration power generator according to the first or second aspect, wherein when the vibrating body is at the resting position with respect to the fixed substrate, a width of each of the plurality of first fixed electrodes and each of the plurality of second fixed electrodes in the vibration direction is longer than a width of overlap between each of the plurality of electret electrodes and each of the plurality of first fixed electrodes or each of the plurality of second fixed electrodes in the vibration direction if viewed from a top down perspective.

(Fourth Aspect)

A fourth aspect of the present invention is the vibration power generator according to any one of the first to third aspects, wherein when the vibrating body is at the resting position with respect to the fixed substrate, the width of each of the plurality of first fixed electrodes and each of the plurality of second fixed electrodes is longer than a sum of a width of overlap between each of the plurality of electret electrodes and each of the plurality of first fixed electrodes and a width of overlap between each of the plurality of electret electrodes and each of the plurality of second fixed electrode.

(Fifth Aspect)

A fifth aspect of the present invention is a vibration power generator, comprising:

a fixed substrate;

a vibrating body having a surface opposed to a surface of the fixed substrate, the vibrating body being vibratable with respect to the fixed substrate;

a plurality of electret electrodes aligned in a vibration direction of the vibrating body on one of the surface of the fixed substrate and the surface of the vibrating body; and a plurality of first fixed electrodes and a plurality of second fixed electrode, each of the plurality of first fixed electrodes and each of the plurality of second fixed electrodes being alternately aligned in the vibration direction on the other of the surface of the fixed substrate and the surface of the vibrating body, wherein when the vibrating body is not at a resting position with respect to the fixed substrate, a distance (s) between each of the plurality of first fixed electrodes and each of the plurality of second fixed electrodes is not shorter than a half length of a distance (gap g) between each of the plurality of electret electrodes and each of the plurality of first fixed electrodes or each of the plurality of second fixed electrodes.

(Sixth Aspect)

A sixth aspect of the present invention is the vibration power generator according to the fifth aspect, wherein when the vibrating body is at the resting position with respect to the fixed substrate, each of the plurality of electret electrodes overlaps with both electrodes of a corresponding fixed electrode pair if viewed from a top down perspective, the corresponding fixed electrode pair being one of the plurality of first fixed electrodes and one of the plurality of second fixed electrodes that are opposed to the one of the plurality of electret electrodes, and wherein when the vibrating body is not at the resting position, each of the plurality of electret electrodes always overlaps with at least one electrode of the corresponding fixed electrode pair.

(Seventh Aspect)

A seventh aspect of the present invention is the vibration power generator according to any one of the first to sixth aspects, wherein the plurality of electret electrodes are formed into a comb shape or strips, and at least either the plurality of first fixed electrodes or the plurality of second fixed electrodes are formed into a comb shape.

(Eighth Aspect)

A eighth aspect of the present invention is a vibration power generator, comprising:

a fixed substrate;

a vibrating body having a surface opposed to a surface of the fixed substrate, the vibrating body being vibratable with respect to the fixed substrate;

a plurality of electret electrodes aligned in a vibration direction of the vibrating body on one of the surface of the fixed substrate and the surface of the vibrating body; and a plurality of first fixed electrodes and a plurality of second fixed electrodes, each of the plurality of first fixed electrodes and each of the plurality of second fixed electrodes being alternately aligned in the vibration direction on the other of the surface of the fixed substrate and the surface of the vibrating body;

wherein when the vibrating body is at a resting position, each of the plurality of electret electrodes overlaps with one of each of the plurality of first fixed electrodes and each of the plurality of second fixed electrodes and does not overlap the other of each of the plurality of first fixed electrodes and each of the plurality of second fixed electrodes if viewed from a top down perspective, and a width of each of the plurality of electret electrodes is longer than a width of the one of each of the plurality of first fixed electrodes and each of the plurality of second fixed electrodes.

Hereinafter, embodiments of the present invention will be described in detail with reference to the drawings. However, the present invention is not limited to the following embodiments.

First Embodiment

Figure 1B:
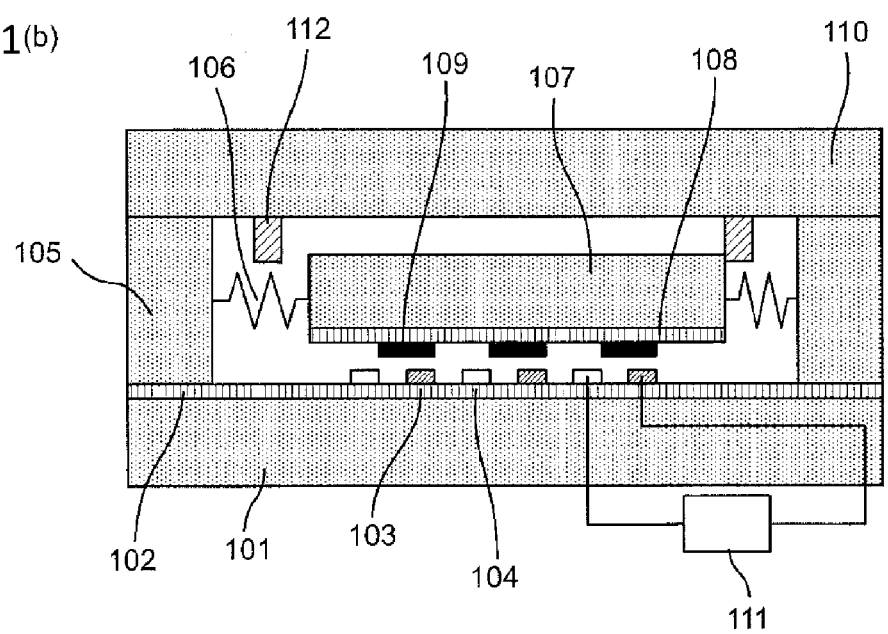
FIG. 1(b) is a cross-sectional view of the vibration power generator according to the embodiment of the present invention when the vibrating body is at the position of maximum displacement.

FIGS. 1(*a*) and 1(*b*) illustrate a vibration power generator according to an embodiment of the present invention. FIG. 1(*a*) is a cross-sectional view of the vibration power generator with its vibrating body at a resting position. FIG. 1(*b*) is a cross-sectional view of the vibration power generator with its vibrating body at the position of maximum displacement.

Figure 2:
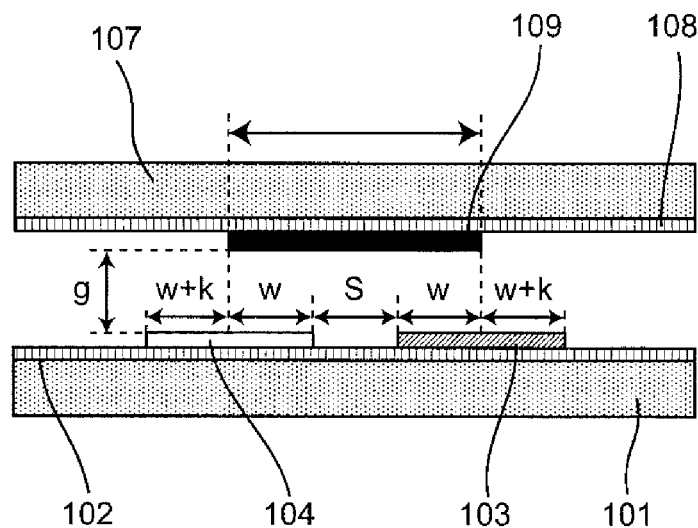
FIGS. 2(a) and 2(b) are enlarged cross-sectional views of the vibration power generator according to the embodiment of the present invention when the vibrating body is at the resting position.
Figure 2:
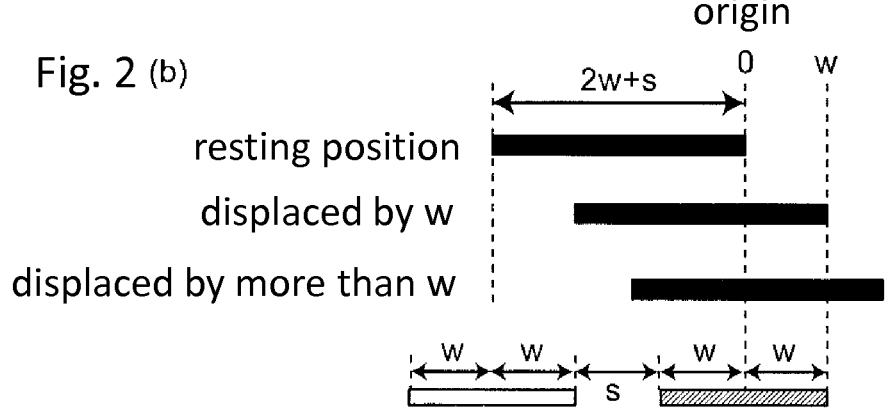

FIGS. 2(*a*) and 2(*b*) are enlarged cross-sectional views of the vibration power generator with its vibrating body at the resting position, showing a part of the vibration power generator of FIGS. 1(*a*) and 1(*b*) (the vibrating body, a fixed substrate, electret electrodes, first fixed electrodes and second fixed electrodes).

As illustrated in FIGS. 1(*a*) and 1(*b*), on a fixed substrate 101 made of silicon, glass or the like, an insulation film 102 made of oxide film or the like is provided. On the insulation film 102, first fixed electrodes 103 and second fixed electrodes 104 each made of polysilicon or the like having a width 2w are alternately aligned at spacings s. On the insulation film 102, a hollow spacer 105 made of silicon, glass, metal or the like is also provided. The vibrating body 107 made of silicon, glass or the like is connected to an inner wall of the hollow spacer 105 via two springs 106. The springs 106 connect the vibrating body 107 to the spacer 105, and thus the vibrating body 107 is vibratable in the x direction. The vibrating body 107 is situated over the first fixed electrodes 103 and the second fixed electrodes 104 provided on the fixed substrate 101 so as to be separated from the first fixed electrodes 103 and the second fixed electrodes 104. The vibrating body 107 is provided with an insulation film 108 on its surface opposed to the insulation film 102. On the insulation film 108, a plurality of electret electrodes 109 made of oxide film or nitride film having a width 2w+s are placed so as to face the first fixed electrodes 103 and the second fixed electrodes 104 at a gap g from them in the z direction. When the vibrating body 107 is at a resting position, each overlap between the electret electrodes 109 and the first fixed electrodes 103 or the second fixed electrodes 104 has a width w in the x direction if viewed from a top down perspective. As used herein, a face-to-face direction (z direction) designates a direction in which the electret electrodes 109 are opposed to the first fixed electrodes 103 and the second fixed electrodes 104. The face-to-face direction (z direction) is perpendicular to the vibration direction (x direction). On the spacer 105, a lid substrate 110 made of silicon, glass or the like is provided. The vibrating body 107 is surrounded by the fixed substrate 101, spacer 105 and lid substrate 110 so as to be sealed in a hermetical condition or low-vacuum condition.

The electret electrodes 109 are injected with negative charge. The vibrating body 107 is vibratable in the x direction. When the vibrating body 107 is at the position of maximum displacement in the x direction (i.e. being displaced by w) as illustrated in FIG. 1(*b*), the electret electrodes 109 are positioned so as to face the first fixed electrodes 103. Accordingly, a first capacitance between the electret electrodes 109 and the first fixed electrodes 103 rises to the maximum value, and thus the highest positive charge is induced at the first fixed electrodes 103. At this moment, a second capacitance between the electret electrodes 109 and the second fixed electrodes 104 falls to the lowest value, and thus the lowest positive charge is induced at the second fixed electrodes 104. Similarly, when the vibrating body 107 is at the position of minimum displacement in the x direction (i.e. being displaced by −w), the electret electrodes 109 are positioned so as to face the second fixed electrodes 104. Accordingly, the second capacitance between the electret electrodes 109 and the second fixed electrodes 104 rises to the maximum value, and thus the highest positive charge is induced at the second fixed electrodes 104. At this moment, the first capacitance between the electret electrodes 109 and the first fixed electrodes 103 falls to the lowest value, and thus the lowest positive charge is induced at the first fixed electrodes 103. Such increases and decreases of the induced charge generate a current, and thus the induced current generates a fluctuating voltage across a load 911 placed between the first fixed electrodes 103 and the second fixed electrodes 104. The vibration power generator thus generates electric power.

When the vibrating body 107 is not at the resting position, the vibration power generator operates such that each electret electrode 109 always overlaps with at least one electrode of the corresponding fixed electrode pair consisting of one of the first fixed electrodes 103 and one of the second fixed electrodes 104 that are opposed to the electret electrode. By regulating the amplitude of the vibration power generator in this manner, the capacity change comes close to linear change. As a result, around the position of displacement=0, the electrostatic force is weak enough not to prevent the movement of the vibrating body, which results in improvement of the power generation. Around the position of maximum displacement, strong electrostatic force can prevent the vibrating body from colliding against a stopper.

In practical uses, although not shown in the figures, the generated alternating voltage is converted to a direct voltage by a rectifier circuit or the like, and further converted to a desired voltage by a regulator or the like. The resulting electric power can be stored in a capacitor or a battery, or can be directly used as a power source for a circuit.

Figure 3:
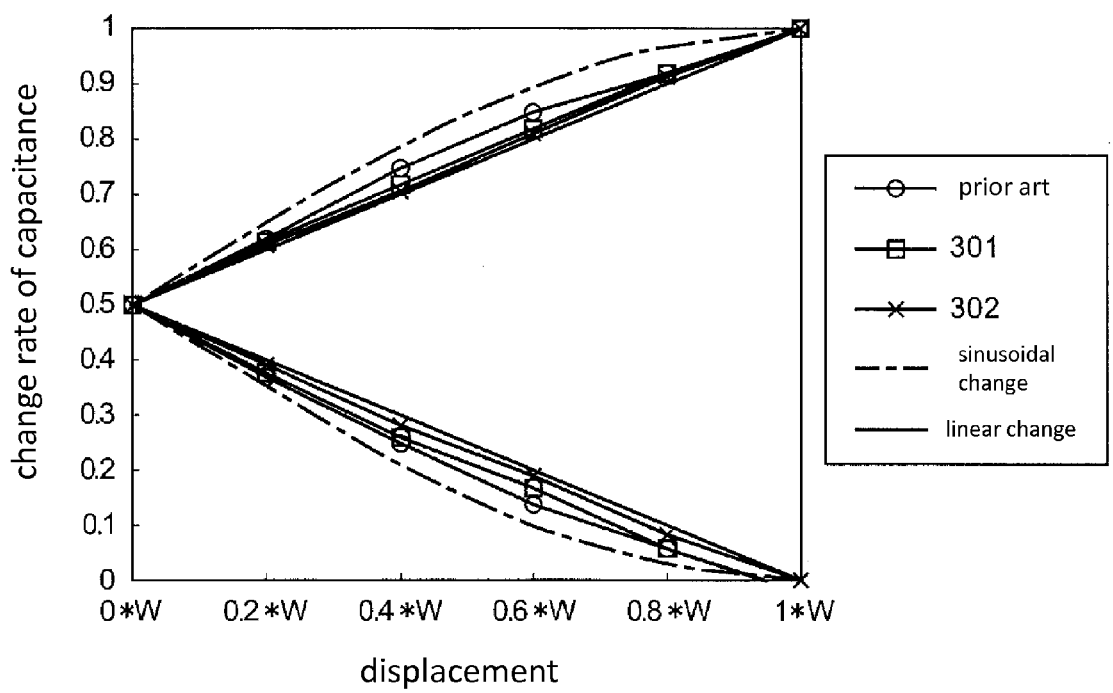
FIG. 3 is a graph plotting displacement of the vibrating body versus capacitance change of the vibration power generator according to the embodiment of the present invention.

FIG. 3 is a graph plotting displacement of the vibrating body versus capacitance change of the vibration power generator according to the first embodiment of the present invention.

FIG. 3 shows change of the first capacitance between the electret electrodes 109 and the first fixed electrodes 103 and change of the second capacitance between the electret electrodes 109 and the second fixed electrodes 104, when the vibrating body 107 displaces from 0 to w in the x direction (also referred to as the vibration direction of the vibrating body 107). Within the range where the vibrating body displaces from 0 to w, change of the first capacitance between the electret electrodes 109 and the first fixed electrodes 103 and change of the second capacitance between the electret electrodes 109 and the second fixed electrodes 104 are normalized such that the values become 0.5 (midpoint) at the position of displacement=0 and become 1.0 at the position of displacement=w or −w. As the displacement changes from 0 to w, the first capacitance is increased and the second capacitance is decreased. They are plotted together in the single graph. The graph does not include the range from −w to 0 of the displacement of the vibrating body 107 since the first capacitance change C1 and the second capacitance change C2 in this range are symmetrical to those in the range from 0 to w of the displacement of the vibrating body 107. For comparison, an example of linearly changing capacitance, i.e. linear capacitance change, and an example of sinusoidal capacitance change are plotted together.

FIG. 2(*a*) is an enlarged cross-sectional view of the vibration power generator according to the embodiment of the present invention, with its vibrating body 107 at the resting position. Further, FIG. 2(*b*) is a schematic diagram illustrating the positional relationship between the electret electrodes 109 and the first fixed electrodes 103 and/or the second fixed electrodes 104 in the following statuses: the vibrating body 107 is at the resting position; the vibrating body 107 is displaced by w; and the vibrating body 107 is displaced by more than w. In FIG. 2(*a*), S is a distance between the first fixed electrode 103 and the second fixed electrode 104 (i.e. a distance from the left end of the first fixed electrode 103 to the right end of the second fixed electrode 104), and g is a distance between the electret electrode 109 and the first fixed electrode 103 or the second fixed electrode 104 (i.e. a distance from the lower face of the electret electrode 109 to the upper face of the first fixed electrode 103 or the second fixed electrode 104).

When the electret electrode 109 is at the resting position, the right end of the electret electrode 109 is positioned at a distance w rightward from the left end of the first fixed electrode 103. When the electret electrode 109 is not at the resting position, the vibrating body 107 is vibrating left and right by w about the origin (where +w (or simply written as w) is the position when the vibrating body 107 is displaced to the rightmost position, and −w is the position when the vibrating body 107 is displaced to the leftmost position). When the electret electrode 109 is at the position of maximum displacement to the right (position of displacement=w), the first fixed electrode 103 sticks out a distance k rightward from the electret electrode 109.

When the electret electrode 109 is at the resting position, the left end of the electret electrode 109 is positioned at a distance w leftward from the right end of the second fixed electrode 104. When the electret electrode 109 is not at the resting position, the vibrating body 107 is vibrating right and left by w about the origin. When the electret electrode 109 is at the position of maximum displacement to the left, the second fixed electrode 104 sticks out a distance k leftward from the electret electrode 109. In FIGS. 2(*a*) and 2(*b*), the vibrating body 107 is configured to shift ±w from the origin. In FIG. 2(*b*), k is set to 0.

FIG. 10 is a graph on the conventional vibration power generator, showing change of the first capacitance between the electret electrodes and the first fixed electrodes and change of the second capacitance between the electret electrodes and the second fixed electrodes, in accordance with displacement of the vibrating body. If the electrodes were arranged as the conventional example as shown in FIG. 10, the gap g between the first fixed electrodes 103 or the second fixed electrodes 104 and the electret electrodes 109 would be w in the z direction, the distance s between the first fixed electrodes 103 and the second fixed electrodes 104 would be w/10, and k would be 0. In contrast, in the vibration power generator of the present invention, the gap g is w, s is set to w, and k is set to 0. The capacitance change with this setting is plotted in FIG. 3, which is denoted by 301. In another aspect of the present invention, s is set to w, and k is set to 0.4 w. The capacitance change with this setting is denoted by 302 in FIG. 3. As can be seen in FIG. 3, the capacitance changes according to displacement of the vibrating body 107 gets closer to linear change in the order of the conventional example, 301 and 302.

As shown in FIG. 11, the electrode arrangement of the present embodiment reduces the differential dC/dx with respect to displacement in the x direction in the range of ±0.56 w or less of the displacement of the vibrating body 107, which decreases the electrostatic force and increases the power generation. Further, since the actual displacement in ordinary use is often smaller than the maximum displacement ±w, the power generator often operates within the range having weak electrostatic force, which increases the power generation efficiently. Further, while the maximum displacement is limited to ±w by providing a stopper 112 or the like, the electrostatic force at the maximum displacement is larger than that of conventional generators, which produces an effect of reducing collision against the stopper 112 or breakage of the springs 106.

Figure 4:
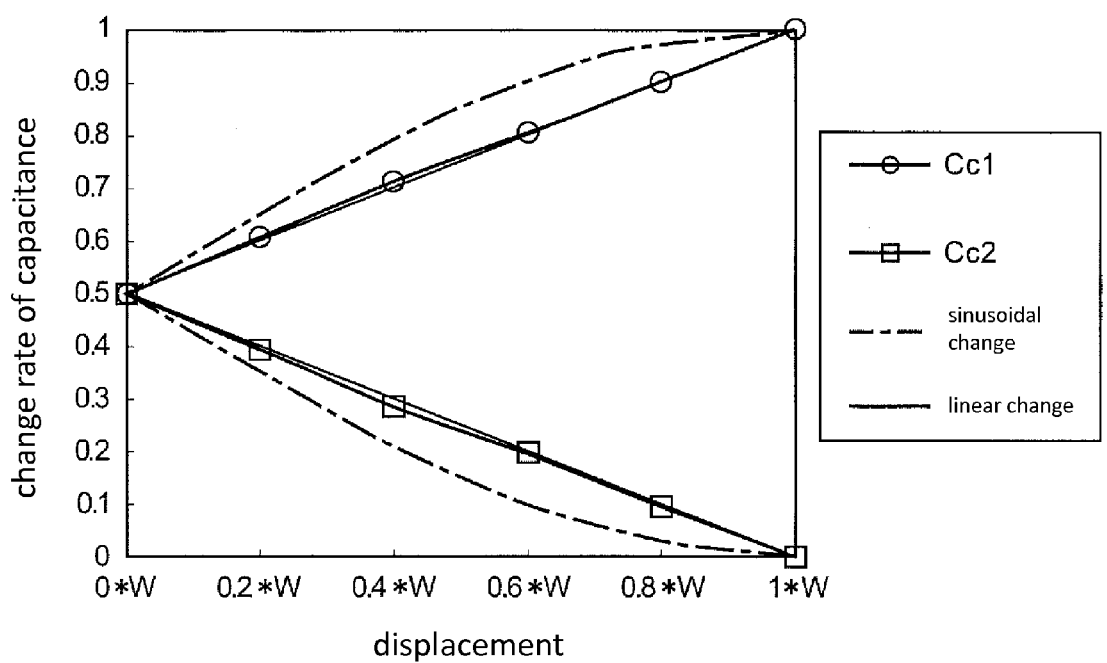
FIG. 4 is a graph showing change of a first capacitance between electret electrodes and first fixed electrodes and change of a second capacitance between the electret electrodes and the second fixed electrodes, if the gap g is reduced to w/5 in the vibration power generator according to the embodiment of the present invention.

Since the displacement in the x direction is as small as ±w as compared to conventional generators, the fluctuation in the z direction is also small when the vibrating body 107 is vibrating in the x direction by the action of the springs 106. As a result, even if the gap g between the first fixed electrodes 103 or the second fixed electrodes 104 and the electret electrodes 109 in the z direction is reduced to w/5, the electrodes can keep this narrow gap and do not come in contact with each other during the vibration. The capacitance change in this setting is shown in FIG. 4, where the electrode arrangement in the x direction is the same as the conventional example, i.e. the distance s between the first fixed electrodes 103 and the second fixed electrodes 104 is set to w/10, and k is set to 0. Change of the first capacitance Cc1 between the electret electrodes 109 and the first fixed electrodes 103 and change of the second capacitance Cc2 between the electret electrodes 109 and the second fixed electrodes 104 are both identical to linear change in the range of the displacement of the vibrating body 107 from 0 to w. As a result, this configuration also offers the effects of reducing the electrostatic force and improving the power generation.

As described above, the present inventors found that even when the distance s between the first fixed electrodes 103 and the second fixed electrodes 104 (hereinafter referred to as inter-fixed electrode distance) is set to w/10 (the same length as the conventional generator), the first capacitance change Cc1 and the second capacitance change Cc2 are both identical to linear change as illustrated in FIG. 4, and the power generation can be improved by setting the gap g to as narrow as w/5. Based on this findings, if the inter-fixed electrode distance s is set longer than the conventional generator (s=w/10), the influence on the fringing fields is reduced, and better effects can be obtained (see the description below for more detail). This can be expressed by the following expression 1

$$s \geq w/10 \quad (1)$$

Further, the above condition for the gap can be expressed by the following expression 2.

$$g = w/5 \quad (2)$$

Expression 1 and expression 2 yield expression 3.

$$s \geq g/2 \quad (3)$$

As a result, by setting the distance (s) between the first fixed electrodes and the second fixed electrodes to not shorter than ½ of the distance (gap g) between the electret electrodes and the first fixed electrodes or the second fixed electrodes, the capacitance change comes close to linear change, which makes it possible to improve the power generation. Furthermore, a braking force acts on the vibrating body 107 when the vibrating body 107 is around the position of maximum displacement, which prevents the vibrating body 107 from colliding against the stopper.

Figure 13:
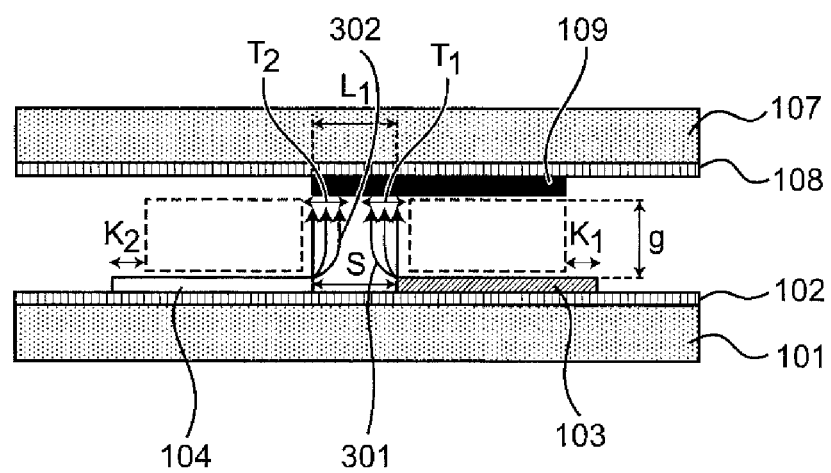
FIG. 13 is a view for briefing a fringing field of the vibration power generator according to the embodiment of the present invention (with a wider gap g)
Figure 14:
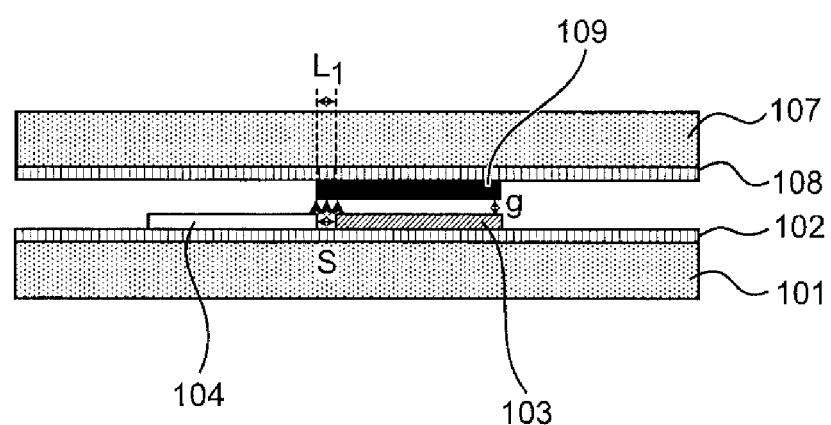
FIG. 14 is a view for briefing a fringing field of the vibration power generator according to the embodiment of the present invention (with a narrower gap g)

FIG. 13 is a schematic view of the vibration power generator of FIG. 1, illustrating only the vibrating body 107, fixed substrate 101, one of the electret electrodes 109, one of the first fixed electrodes 103, one of the second fixed electrodes 104 and insulation films 102 and 108. FIGS. 12 through 14 show the electrical flux lines of only fringing fields, and the electrical flux lines of other electric fields (i.e. those in the areas surrounded by the dotted lines in FIGS. 12 and 13, for example) are omitted.

As illustrated in FIG. 13, a vibration power generator according to an aspect of the present invention includes: a fixed substrate 101; a vibrating body 107 having a surface opposed to a surface of the fixed substrate 101, the vibrating body being vibratable with respect to the fixed substrate 101; a plurality of electret electrodes 109 aligned in a vibration direction of the vibrating body 107 on one of the surface of the fixed substrate 101 and the surface of the vibrating body 107; and a plurality of first fixed electrodes 103 and a plurality of second fixed electrodes 104, each of the plurality of first fixed electrodes 103 and each of the plurality of second fixed electrodes 104 being alternately aligned in the vibration direction on the other of the surface of the fixed substrate 101 and the surface of the vibrating body 107;

wherein when the vibrating body 107 is at a resting position with respect to the fixed substrate 101, each of the plurality of electret electrodes 109 overlaps with both electrodes of a corresponding fixed electrode pair if viewed from a top down perspective, the corresponding fixed electrode pair being one of the plurality of first fixed electrodes 103 and one of the plurality of second fixed electrodes 104 that are opposed to the electret electrode 109, and when the vibrating body 107 is not at a resting position, each of the plurality of electret electrodes always overlaps with at least one electrode of the corresponding fixed electrode pair, and wherein a distance s between the first fixed electrodes 103 and the second fixed electrodes 104 is set to such a width that a first fringing field 301 and a second fringing field 302 are not largely affected by each other, where the first fringing field 301 is an electric field created by an electric flux from the first fixed electrodes 103 to the electret electrodes 109 as expanding toward the second fixed electrodes 104 and the second fringing field 302 is an electric field created by an electric flux from the second fixed electrodes 104 to the electret electrodes 109 as expanding toward the first fixed electrodes 103.

In general, electric flux lines run straight in the overlapped facing areas if viewed from a top down perspective. In addition, curved electric flux lines run from edges of electrodes toward adjacent electrodes that are not opposed and overlapped if viewed from a top down perspective. The electric field created by this type of electric flux lines is called as a fringing field.

In the conventional vibration power generator as illustrated in FIG. 12, the distance s between the first fixed electrodes 103 and the second fixed electrodes 104 is set to such a width that the first fringing field 301 and the second fringing field 302 are strongly affected by each other. Accordingly, the first fringing field 301 and the second fringing field 302 are subject to forces (repulsion forces) that push them away from each other. In this case, the expansion width $T_1$ of the first fringing field 301 and the expansion width $T_2$ of the second fringing field 302 are both reduced by the repulsion forces as compared to the case without repulsion force, which eventually reduces the capacitance change (i.e. the capacitance change is drastically decreased when the vibrating body reaches around the position of maximum amplitude. Accordingly, the capacitor change comes close to sinusoidal change, and the vibrating body becomes less movable because it is subjected to strong electrostatic force when it starts to move.

As described above, by setting the distance s between the first fixed electrode 103 and the second fixed electrode 104 to such a long width that the first fringing field 301 and the second fringing field 302 are not largely affected by each other, the first fringing field 301 and the second fringing field 302 are reduced less. In this case, since the expansion width $T_1$ of the first fringing field 301 and the expansion width $T_2$ of the second fringing field 302 are not reduced much, the capacitor change is not reduced. Accordingly, the capacitor change comes close to linear change, and the vibrating body becomes more movable because it is subjected to weak electrostatic force when it starts to move. As a result, it is possible to provide the vibration power generator with high power generation.

In the vibration power generator of the present invention, it is preferred that the electret electrodes 109 are placed on the vibrating body 107, and the first fixed electrodes 103 and the second fixed electrodes 104 are placed on the fixed substrate 101. This is because if the first fixed electrodes 103 and the second fixed electrodes 104 are placed on the vibrating body 107, and the electret electrodes 109 are placed on the fixed substrate 101, wires from the load ill may interfere a vibration of the vibrating body 107 on which the first fixed electrodes 103 and the second fixed electrodes 104 are placed, since the wires are connected to the first fixed electrodes 103 and the second fixed electrodes 104. In contrast, if the electret electrodes 109 are placed on the vibrating body 107, and the first fixed electrodes 103 and the second fixed electrodes 104 are placed on the fixed substrate 101 as described above, the wires from the load 111 do not interfere the vibration of the vibrating body 107, since the wires are not connected to the vibrating body 107 but to the first fixed electrodes 103 and the second fixed electrode 104 on the fixed substrate 101. In accordance with this configuration, since the vibration of the vibrating body 107 is not interfered, it is possible to provide the vibration power generator with high power generation.

As another aspect of the present invention, the vibration power generator may be configured such that, as illustrated in FIGS. 13, when the vibrating body 107 is at the position of maximum displacement to the fixed electrode 103, a first length $L_1$ of a part of the electret electrode 109 sticking out from the first fixed electrode 103 toward the second fixed electrode 104 is set longer than the expansion width $T_1$ of the first fringing field 301, and when the vibrating body 107 is at the position of maximum displacement to the second fixed electrode 104, a second length $L_2$ of a part of the electret electrode 109 sticking out from the second fixed electrode 104 toward the first fixed electrode 103 is set longer than the expansion width $T_2$ of the second fringing field 302.

As illustrated in FIG. 13, the first length $L_1$ is the length of a part of the electret electrode 109 sticking out from the first fixed electrode 103 toward the second fixed electrode 104, i.e. the distance between the left end of the electret electrode 109 and the left end of the first fixed electrode 103 in the x direction, when the vibrating body 107 is at the position of maximum displacement to the first fixed electrode 103. The second length $L_2$ is not shown in FIG. 13 as being similar to the first length $L_1$. The second length $L_2$ is the length of a part of the electret electrode 109 sticking out from the second fixed electrode 104 toward the first fixed electrode 103, i.e. the distance between the right end of the electret electrode 109 and the right end of the first second electrode 104 in the x direction, when the vibrating body 107 is at the position of maximum displacement to the second fixed electrode 104.

If the first length $L_1$ is shorter than the expansion width $T_1$ of the first fringing field 301, the expansion width $T_1$ of the first fringing field 301 is reduced when the vibrating body 107 is at the position of maximum displacement to the first fixed electrode 103, which suppresses the capacitance change at the maximum displacement. The capacitance change accordingly comes close to sinusoidal change, and the breaking force does not act on the vibrating body 107 very much when the vibrating body 107 is at the position of maximum displacement, which increases the risk of collision of the vibrating body 107 against the stopper. The same is true if the second length $L_2$ is shorter than the expansion width $T_2$ of the second fringing field 302.

In contrast, if the first length $L_1$ is longer than the expansion width $T_1$ of the first fringing field 301, the expansion width $T_1$ of the first fringing field 301 is not reduced when the vibrating body 107 is at the position of maximum displacement, and the capacitance change is not suppressed at the maximum displacement. The capacitance change accordingly comes close to linear change, and the breaking force acts on the vibrating body 107 when the vibrating body 107 is around the position of maximum displacement, which decreases the risk of collision of the vibrating body 107 against the stopper. The same is true if the second length $L_2$ is longer than the expansion width $T_2$ of the second fringing field 302.

As described above, the capacitance change comes close to linear change by setting the first length $L_1$ to be longer than the expansion width $T_1$ of the first fringing field 301, and setting the second length $L_2$ to be longer than the expansion width $T_2$ of the second fringing field 302. With this configuration, the vibrating body 107 is more movable because the vibrating body 107 is subjected to weak electrostatic force when it starts to move. As a result, it is possible to provide the vibration power generator with high power generation. Furthermore, since the breaking force acts on the vibrating body 107 when it is around the position of maximum displacement, it is possible to decrease the risk of collision of the vibrating body 107 against the stopper.

As yet another aspect of the present invention, the vibration power generator may be configured such that, as illustrated in FIGS. 13 and 14, the distance (gap g) between the electret electrode 109 and the fixed electrode pair is set to a length that makes the expansion width $T_1$ of the first fringing field 301 be not longer than the first length $L_1$ when the vibrating body 107 is at the position of maximum displacement to the fixed electrode 103, and the distance (gap g) between the electret electrode 109 and the fixed electrode pair is also set to a length that makes the expansion width $T_2$ of the second fringing field 302 be not longer than the second length $L_2$ when the vibrating body 107 is at the position of maximum displacement to the fixed electrode 104.

As described above, the electric flux lines of the first fringing field 301 run from the first fixed electrodes 103 to the electret electrode 109 as expanding toward the second fixed electrode 104. As illustrated in FIG. 13, if the gap g is wide, the expansion width $T_1$ of the first fringing field 301 is wide. On the contrary, as illustrated in FIG. 14, if the gap g is narrow, the expansion width $T_1$ of the first fringing field 301 is narrow. Thus, there is a correlation between the gap g and the expansion widths $T_1$ and $T_2$ of the first and second fringing fields 301 and 302. By adjusting the gap g, the expansion width $T_1$ of the first fringing field 301 can be reduced to the first length $L_1$ or less when the vibrating body 107 is at the position of maximum displacement to the first fixed electrode 103. This makes the capacitance change to come close to linear change as described above. Accordingly, the vibrating body 107 is more movable because the vibrating body 107 is subjected to weak electrostatic force when it starts to move. As a result, it is possible to provide the vibration power generator with high power generation. Furthermore, when the vibrating body 107 is around the position of maximum displacement, the breaking force acts on the vibration body 107, which reduces the risk of the vibrating body 107 colliding against the stopper. The same is true when the vibrating body 107 is at the position of maximum displacement to the second fixed electrode 104.

FIG. 14 does not show the expansion width $T_1$ of the first fringing field 301 and the expansion width $T_2$ of the second fringing field 302.

As yet another aspect of the present invention, the vibration power generator may be configured such that when the vibrating body 107 is at the position of maximum displacement to the first fixed electrode 103, a third length $K_1$ of a part of the first fixed electrode 103 sticking out from the electret electrode 109 in the vibration direction is not shorter than an expansion width $T_3$ of a third fringing field 303, which is created by electric flux lines flowing from the first fixed electrode 103 to the electret electrode 109 as expanding in the direction opposite to the displacing direction, and when the vibrating body 107 is at the position of maximum displacement to the second fixed electrode 104, a fourth length $K_2$ of a part of the second fixed electrode 104 sticking out from the electret electrode 109 in the vibration direction is not shorter than an expansion width $T_4$ of a fourth fringing field 304, which is created by electric flux lines flowing from the second fixed electrode 104 to the electret electrode 109 as expanding in the direction opposite to the displacing direction.

As illustrated in FIG. 13, the third length $K_1$ is the length of a part of the first fixed electrode 103 sticking out from the electret electrode 109 in the vibration direction when the vibrating body 107 is at the position of maximum displacement to the first fixed electrode 103, i.e. the distance between the right end of the electret electrode 109 and the right end of the first fixed electrode 103 in the x direction. Further, the fourth length $K_2$ is the length of a part of the second fixed electrode 104 sticking out from the electret electrode 109 in the vibration direction when the vibrating body 107 is at the position of maximum displacement to the second fixed electrode 104, i.e. the distance between the left end of the electret electrode 109 and the left end of the second fixed electrode 104 in the x direction.

If the third length $K_1$ is shorter than the expansion width $T_3$ of the third fringing field 303, the expansion width $T_3$ of the third fringing field 303 is reduced when the vibrating body 107 is at the position of maximum displacement to the fixed electrode 103, which suppresses the capacitance change around the maximum displacement. The capacitance change accordingly comes close to linear change, and the breaking force does not act on the vibrating body 107 very much when the vibrating body 107 is around the position of maximum displacement, which increases the risk of the vibrating body 107 colliding against the stopper. The same is true if the fourth length $K_2$ is shorter than the expansion width $T_4$ of the fourth fringing field 304.

In contrast, if the third length $K_1$ is longer than the expansion width $T_3$ of the third fringing field 303, the expansion width $T_3$ of the third fringing field 303 is reduced when the vibrating body 107 is at the position of maximum displacement to the fixed electrode 103, and the capacitance change is not suppressed around the maximum displacement. The capacitor change accordingly comes close to linear change, and the breaking force acts on the vibrating body 107 around the position of maximum displacement, which decreases the risk of the vibrating body 107 colliding against the stopper. The same is true if the fourth length $K_2$ is longer than the expansion width $T_4$ of the fourth fringing field 304.

As described above, by setting the third length $K_1$ to be not shorter than the expansion width $T_3$ of the third fringing field 303 and setting the fourth length $K_2$ to be not shorter than the expansion width $T_4$ of the second fringing field 304, the capacitance change comes close to liner change. In accordance with this configuration, the vibrating body 107 is more movable because the vibrating body 107 is subjected to weak electrostatic force when it starts to move. As a result, it is possible to provide the vibration power generator with high power generation. Furthermore, when the vibrating body 107 is around the position of maximum displacement, the breaking force acts on the vibration body 107, which reduces the risk of the vibrating body 107 colliding against the stopper.

In the vibration power generator of the present invention, it is preferred that when the vibrating body 107 is at the resting position with respect to the fixed substrate 101, the width of the first fixed electrodes 103 or the second fixed electrodes 104 is longer than the sum of the width of the overlap between the electret electrodes 109 and the first fixed electrodes 103 and the width of the overlap between the electret electrodes 109 and the second fixed electrodes 104 in the vibrating direction if viewed from a top down perspective. In accordance with this configuration, the capacitor change does not slow down but follows linear change when the vibrating body 107 is around the position of maximum displacement.

According to yet another aspect of the present invention, a vibration power generator includes: a fixed substrate 101; a vibrating body 107 having a surface opposed to a surface of the fixed substrate 101, the vibrating body 107 being vibratable with respect to the fixe substrate 101;

a plurality of electret electrodes 109 aligned in a vibration direction of the vibration body 107 on one of the surface of the fixed substrate 101 and the surface of the vibrating body 107; and a plurality of first fixed electrodes 103 and a plurality of second fixed electrodes 104, each of the plurality of first fixed electrodes 103 and each of the plurality of second fixed electrodes 104 being alternately aligned in the vibration direction on the other of the surface of the fixed substrate 101 and the surface of the vibrating body 107, wherein when the vibrating body 107 is at a resting position with respect to the fixed substrate 101, a width of each overlap between the plurality of electret electrodes 109 and the plurality of first fixed electrodes 103 or the plurality of second fixed electrodes 104 in the vibrating direction if viewed from a top down perspective is longer than five times a distance (gap g) between the plurality of electret electrode 109 and the plurality of first fixed electrodes 103 or the plurality of second fixed electrodes 104. In accordance with this configuration, the fringing effect can be sufficiently exerted, and thus the capacitance comes close to linear change.

In the vibration power generator of the present invention, it is preferred that when the vibrating body 107 is at the resting position with respect to the fixed substrate 101, each of the plurality of electret electrodes 109 overlaps with both electrodes of corresponding fixed electrode pair, the corresponding fixed electrode pair being one of the plurality of first fixed electrodes 103 and one of the plurality of second fixed electrodes 104, and wherein when the vibrating body 107 is not at the resting position, each of the plurality of electret electrodes 109 always overlaps with at least one electrode of the corresponding fixed electrode pair.

Figure 5:
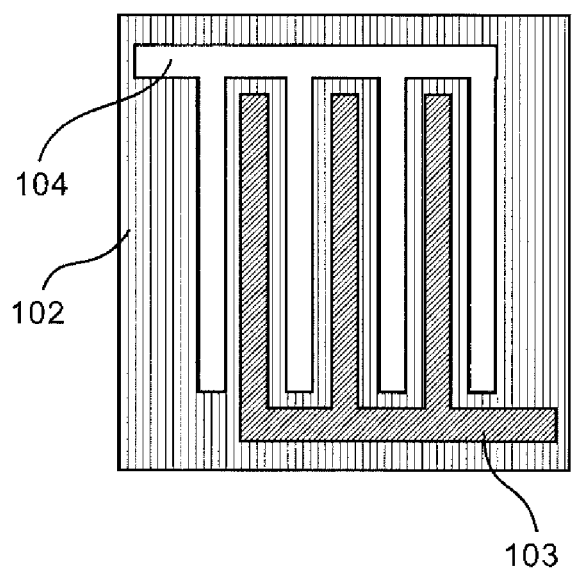
FIG. 5 is a plan view of a fixed substrate 101 of the vibration power generator according to the embodiment of the present invention.
Figure 6:
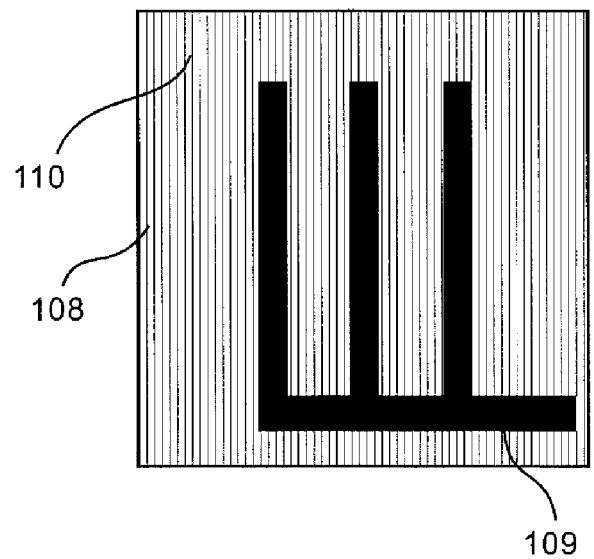
FIGS. 6(a) and 6(b) are plan views of a vibrating body 107 of the vibration power generator according to the embodiment of the present invention.
Figure 6:
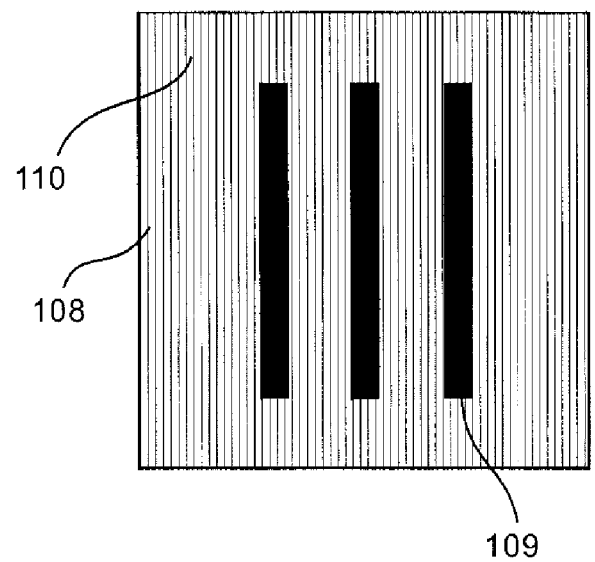

While there are the plurality of first fixed electrode 103 and the plurality of second fixed electrode 104, each set of electrodes may be formed into a comb shape connected to each other, as illustrated in FIG. 5. In accordance with this configuration, a load 111 can be easily connected thereto. The plurality of electret electrodes 109 may also be formed into a single comb shape as with the first fixed electrodes 103 or the second fixed electrodes 104, as illustrated in FIG. 6(a). Alternatively, they may be formed into separate strips as illustrated in FIG. 6(b).

Although the stoppers 112 are provided to limit the maximum displacement to ±w, they may be omitted, for example by designing springs 106 so that the maximum displacement is limited to ±w.

The vibration power generators with the above configurations have the following advantageous effects.

(1) Change of the capacitance between the electret electrodes 109 and first fixed electrodes 103 and change of the capacitance between the electret electrodes 109 and the second fixed electrodes 104 with respect to displacement of the vibrating body 107 can be brought closer to linear change, and the electrostatic force can be reduced in a large part of the displacement range. As a result, it is possible to increase the power generation of the vibration power generator.

(2) The electrostatic force at the time the vibration body 107 reaches the position of maximum displacement is stronger than that of the conventional generator, which can reduce the risk of collision of the vibrating body 107 against the stopper 112 and breakage of the springs 106.

(3) A closed room is formed by the fixed substrate 101, spacer 105 and lid substrate 110, which is hermetically sealed from external air. This can prevent the charge of the electret electrodes 109 from desorption. The sealing structure is not limited to the above-described embodiment.

Although the springs 106 are made of coil springs in the above-described embodiment, they are not limited thereto and may be made of any material such as high-bouncing elastic materials that can serve like a spring (i.e. vibratable).

The above-described materials of the fixed substrate 101, insulation film 102, first fixed electrodes 103, second fixed electrodes 104, spacer 105, vibrating body 107, insulation film 108, electret electrodes 109 and lid substrate 110 are only examples. That is, the fixed substrate 101 and lid substrate 110 may be made of resin substrate or metal block. The first fixed substrates 103 and the second fixed substrates 104 may be made of conductive material such as aluminum and copper. The electret electrodes 109 may be made of organic electret material.

In the above-described embodiment, the fixed electrodes and electret electrodes are opposed to each other in the vertical direction, and the electret electrodes 109 are positioned over the fixed electrodes 103. However, in the present invention, the positional relationship is not limited thereto as long as the fixed electrode 103 and the electret electrodes 109 are positioned so as to face to each other. For example, the fixed electrodes and the electret electrodes are opposed to each other in the vertical direction, but the electret electrodes may be positioned below the fixed electrodes. Also, the fixed electrodes and the electret electrodes may be opposed to each other in the horizontal direction.

FIGS. 1(a) through 2(b) illustrate the lead wires of the load 111 as a wiring diagram. It is needless to say that the load 111 may be connected through a wiring electrode, via-electrode or the like placed on a substrate.

In the above-described embodiment, the electret electrodes 109 are injected with negative charge, however they may be injected with positive charge instead. If they are injected with positive charge, the electric current flows in the opposite direction because the polarity of the induced charge is different. It is however needless to say that the same advantageous effects as the above-described embodiment can be obtained.

It will be understood by those skilled in the art that the foregoing and other changes and modifications may be made in the embodiment without departing from the spirit and scope of the invention.

Second Embodiment

Figure 7:
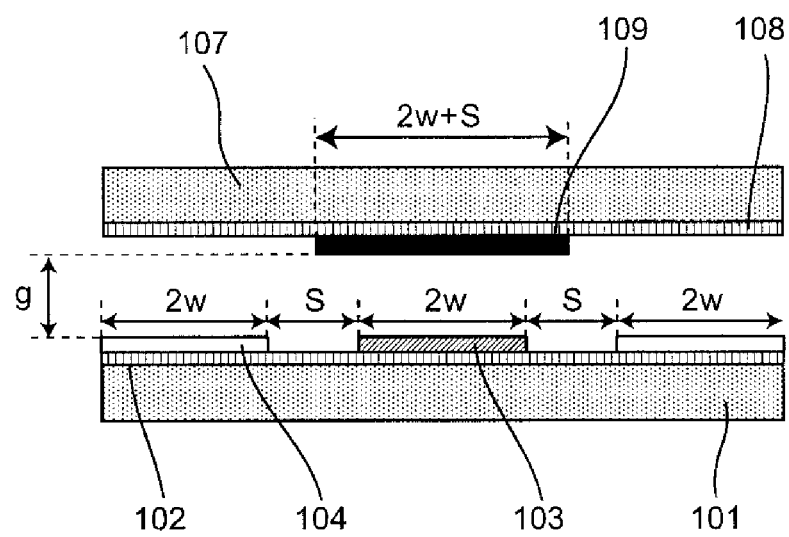
FIG. 7 is a cross-sectional view of the vibration power generator according to an embodiment of the present invention when an electret electrode is opposed to a first fixed electrode.

FIG. 7 is an enlarged cross-sectional view of a vibration power generator according to an embodiment of the present invention, when the generator is in a resting state. The same components as those of the previously-described first embodiment are referred by the same reference numbers, and the descriptions therefor are omitted.

Figure 8:
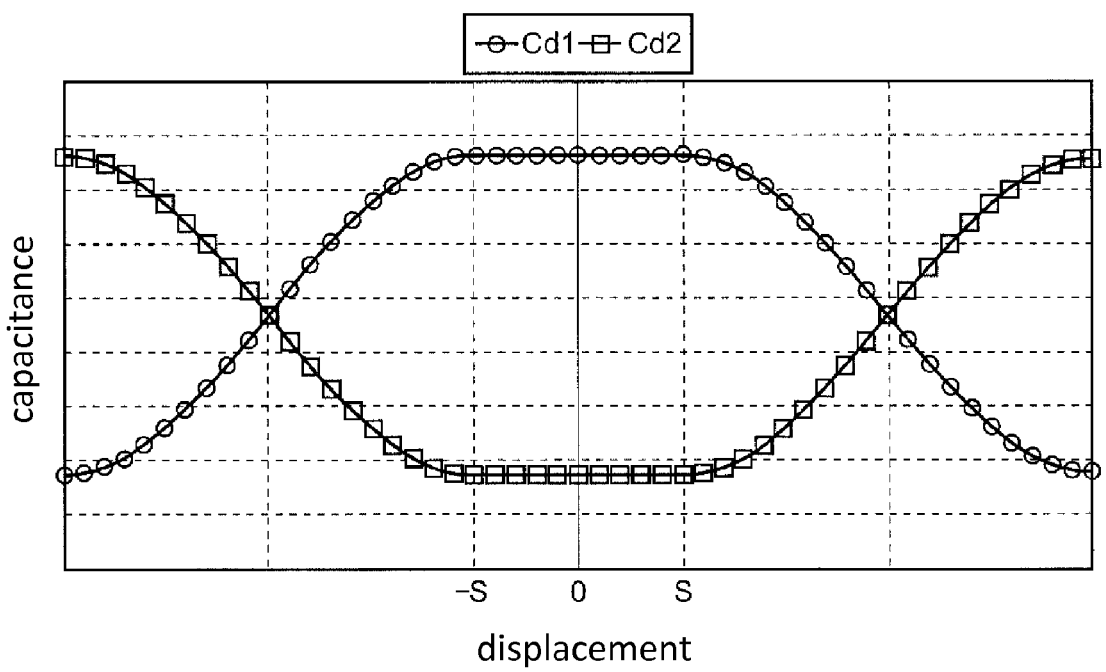
FIG. 8 is a graph on the vibration power generator according to the embodiment of the present invention, showing change of the first capacitance between the electret electrodes and the first fixed electrodes and change of the second capacitance between the electret electrodes and the second fixed electrodes when the electret electrodes are opposed to the first fixed electrodes.

When a vibrating body 107 is at a resting position, an electret electrode 109 is positioned so as to face a first fixed electrode 103. The electret electrode 109 has a width $2w+s$, which is longer than the width $2w$ of the first fixed electrode 103. FIG. 8 shows change of a first capacitance Cd1 between the electret electrodes 109 and the first fixed electrodes 103 and change of a second capacitance Cd2 between the electret electrodes 109 and the second fixed electrodes 104, when the vibrating body 107 is displaced from 0. The capacitances do not change within a certain range of the displacement from the resting position, which means the differentials dC/dx of the capacitances with respect to displacement are 0, and the electrostatic force in the x direction is 0. As a result, the vibrating body 107 is more movable from the resting position, which makes easier to generate electric power.

That is, according to another aspect of the present invention, the vibration power generator includes:

a fixed substrate;

a vibrating body having a surface opposed to a surface of the fixed substrate, the vibrating body being vibratable with respect to the fixed substrate;

a plurality of electret electrodes aligned in a vibration direction of the vibrating body on one of the surface of the fixed substrate and the surface of the vibrating body; and a plurality of first fixed electrodes and a plurality of second fixed electrodes, each of the plurality of first fixed electrodes and each of the plurality of second fixed electrodes being alternately aligned in the vibration direction on the other of the surface of the fixed substrate and the surface of the vibrating body, wherein when the vibrating body is at a resting position with respect to the fixed substrate, the plurality of electret electrodes overlap with only either one of the plurality of first fixed electrodes or the plurality of second fixed electrodes, and wherein a width of the plurality of electret electrodes is longer than a width of the overlapped electrodes.

In accordance with the second embodiment of the present invention, it is possible to provide the vibration power generator with increased power generation.

The present invention claims priority to Japanese Patent Application No. 2012-234808 filed on Oct. 24, 2012, the disclosures of all of which are herein incorporated by reference.

EXPLANATION OF REFERENCE SIGNS 101 fixed substrate
102 insulation film
103 first fixed electrode
104 second fixed electrode
105 spacer
106 spring
107 vibrating body
108 insulation film
109 electret electrode
110 lid substrate
111 load
112 stopper
301 capacitance change when s=w, k=0
302 capacitance change when s=w, k=0.4 w
901 fixed substrate
902 insulation film
903 first fixed electrode 904 second fixed electrode
905 spacer
906 spring
907 vibrating body
908 insulation film
909 electret electrode
910 lid substrate
911 load
1301 state with no capacitance change

What is claimed is:

1. A vibration power generator, comprising:
a substrate having a surface;
a vibration body having a surface opposed to the surface of the substrate, the vibration body being vibratable in a vibration direction with respect to the substrate;
a plurality of electret electrodes aligned in the vibration direction on one of the surface of the substrate and the surface of the vibration body; and
a plurality of first electrodes and a plurality of second electrodes alternately aligned in the vibration direction at an interval on the other of the surface of the substrate and the surface of the vibration body, wherein
when the vibration body stops vibrating and is at a resting position with respect to the substrate, each of the plurality of electret electrodes overlaps with both of (i) a corresponding one of the plurality of first electrodes and (ii) a corresponding one of the plurality of second electrodes as viewed from a perpendicular direction to the surface of the substrate,
while the vibration body vibrates with respect to the substrate, each of the plurality of electret electrodes always overlaps with at least one of (i) the corresponding one of the plurality of first electrodes and (ii) the corresponding one of the plurality of second electrodes as viewed from the perpendicular direction,
when the vibration body stops vibrating and is at the resting position with respect to the substrate, a first width in the vibration direction of each of the plurality of first electrodes is wider than a first overlapping width, in the vibration direction, of each of the plurality of electret electrodes with the corresponding one of the plurality of first electrodes as viewed from the perpendicular direction, and
when the vibration body stops vibrating and is at the resting position with respect to the substrate, the first width is wider than a sum of the first overlapping width and a second overlapping width, in the vibration direction, of each of the plurality of electret electrodes with the corresponding one of the plurality of second electrodes as viewed from the perpendicular direction.

2. A vibration power generator, comprising:
a substrate having a surface;
a vibration body having a surface opposed to the surface of the substrate, the vibration body being vibratable in a vibration direction with respect to the substrate;
a plurality of electret electrodes aligned in the vibration direction on one of the surface of the substrate and the surface of the vibration body; and
a plurality of first electrodes and a plurality of second electrodes alternately aligned in the vibration direction at an interval on the other of the surface of the substrate and the surface of the vibration body, wherein
when the vibration body stops vibrating and is at a resting position with respect to the substrate, each of the plurality of electret electrodes overlaps with both of (i) a corresponding one of the plurality of first electrodes and (ii) a corresponding one of the plurality of second electrodes as viewed from a perpendicular direction to the surface of the substrate,
while the vibration body vibrates with respect to the substrate, each of the plurality of electret electrodes always overlaps with at least one of (i) the corresponding one of the plurality of first electrodes and (ii) the corresponding one of the plurality of second electrodes as viewed from the perpendicular direction,
when the vibration body stops vibrating and is at the resting position with respect to the substrate, a first width in the vibration direction of each of the plurality of first electrodes is wider than a first overlapping width, in the vibration direction, of each of the plurality of electret electrodes with the corresponding one of the plurality of first electrodes as viewed from the perpendicular direction,
when the vibration body stops vibrating and is at the resting position with respect to the substrate, a second width in the vibration direction of each of the plurality of second electrodes is wider than a second overlapping width, in the vibration direction, of each of the plurality of electret electrodes with the corresponding one of the plurality of second electrodes as viewed from the perpendicular direction, and
when the vibration body stops vibrating and is at the resting position with respect to the substrate, the first width and the second width each are wider than a sum of the first overlapping width and the second overlapping width.

3. A vibration power generator, comprising:
a substrate having a surface;
a vibration body having a surface opposed to the surface of the substrate, the vibration body being vibratable in a vibration direction with respect to the substrate;
a plurality of electret electrodes aligned in the vibration direction on one of the surface of the substrate and the surface of the vibration body; and
a plurality of first electrodes and a plurality of second electrodes alternately aligned in the vibration direction at an interval on the other of the surface of the substrate and the surface of the vibration body, wherein
when the vibration body stops vibrating and is at a resting position with respect to the substrate, each of the plurality of electret electrodes overlaps with both of (i) a corresponding one of the plurality of first electrodes and (ii) a corresponding one of the plurality of second electrodes as viewed from a perpendicular direction to the surface of the substrate,
while the vibration body vibrates with respect to the substrate, each of the plurality of electret electrodes always overlaps with at least one of (i) the corresponding one of the plurality of first electrodes and (ii) the corresponding one of the plurality of second electrodes as viewed from the perpendicular direction, and
while the vibration body vibrates with respect to the substrate, a width of the interval is not shorter than a half of a distance, in the perpendicular direction, between each of the plurality of electret electrodes and each of the plurality of first electrodes.

4. A vibration power generator, comprising:
a substrate having a surface;
a vibration body having a surface opposed to the surface of the substrate, the vibration body being vibratable in a vibration direction with respect to the substrate;
a plurality of electret electrodes aligned in the vibration direction on one of the surface of the substrate and the surface of the vibration body; and a plurality of first electrodes and a plurality of second electrodes alternately aligned in the vibration direction at an interval on the other of the surface of the substrate and the surface of the vibration body, wherein when the vibration body stops vibrating and is at a resting position with respect to the substrate, each of the plurality of electret electrodes overlaps with both of (i) a corresponding one of the plurality of first electrodes and (ii) a corresponding one of the plurality of second electrodes as viewed from a perpendicular direction to the surface of the substrate, and while the vibration body vibrates with respect to the substrate, each of the plurality of electret electrodes always overlaps with at least one of (i) the corresponding one of the plurality of first electrodes and (ii) the corresponding one of the plurality of second electrodes as viewed from the perpendicular direction, and when the vibration body stops vibrating and is at the resting position with respect to the substrate, a first overlapping width, in the vibration direction, of each of the plurality of electret electrodes with the corresponding one of the plurality of first electrodes as viewed from the perpendicular direction is five or more times of a distance, in the perpendicular direction, between each of the plurality of electret electrodes and each of the plurality of first electrodes.

\* \* \* \* \*